United States Patent [19]

Papantoniou et al.

[11] 4,202,911
[45] May 13, 1980

[54] METHOD OF PREPARING POCKET PITA BREAD

[75] Inventors: Andre Papantoniou; Kostas Papantoniou, both of Chicago, Ill.

[73] Assignee: Pita Baking Company, Chicago, Ill.

[21] Appl. No.: 913,851

[22] Filed: Jun. 8, 1978

[51] Int. Cl.² .................. A21D 6/00; A21D 8/02; A21C 11/10
[52] U.S. Cl. .................. 426/502; 425/293; 426/503; 426/505; 426/512
[58] Field of Search .............. 426/503, 512, 505, 514, 426/502, 517, 496, 499, 138, 279, 143, 518; 99/431, 432, 433, 353, DIG. 15; 425/292, 293, 298; 83/55

[56] References Cited
U.S. PATENT DOCUMENTS

| | | | |
|---|---|---|---|
| 1,964,699 | 6/1934 | Wikstrom | 425/293 |
| 2,059,353 | 11/1936 | Houck | 425/293 |
| 2,144,720 | 1/1939 | Gibson | 426/503 |
| 2,950,693 | 8/1960 | Filiti et al. | 425/298 |
| 3,814,005 | 6/1974 | Widdel | 99/353 |
| 3,872,757 | 3/1975 | Hargadon | 425/298 |
| 3,993,788 | 11/1976 | Longnecker | 426/502 |

*Primary Examiner*—S. Leon Bashore
*Assistant Examiner*—Steve Alvo
*Attorney, Agent, or Firm*—Kinzer, Plyer, Dorn & McEachran

[57] ABSTRACT

Pocket pita dough, to assure a tight closed pocket when the dough is baked, is formed with a compacted edge flange and is crimped concurrently when the dough is cut, made possible by a cutter sleeve having a compacting rim and crimping fins, the latter preferably being attached to a sloped, continuous shoulder for concurrently pressing the dough between the crimps.

4 Claims, 9 Drawing Figures

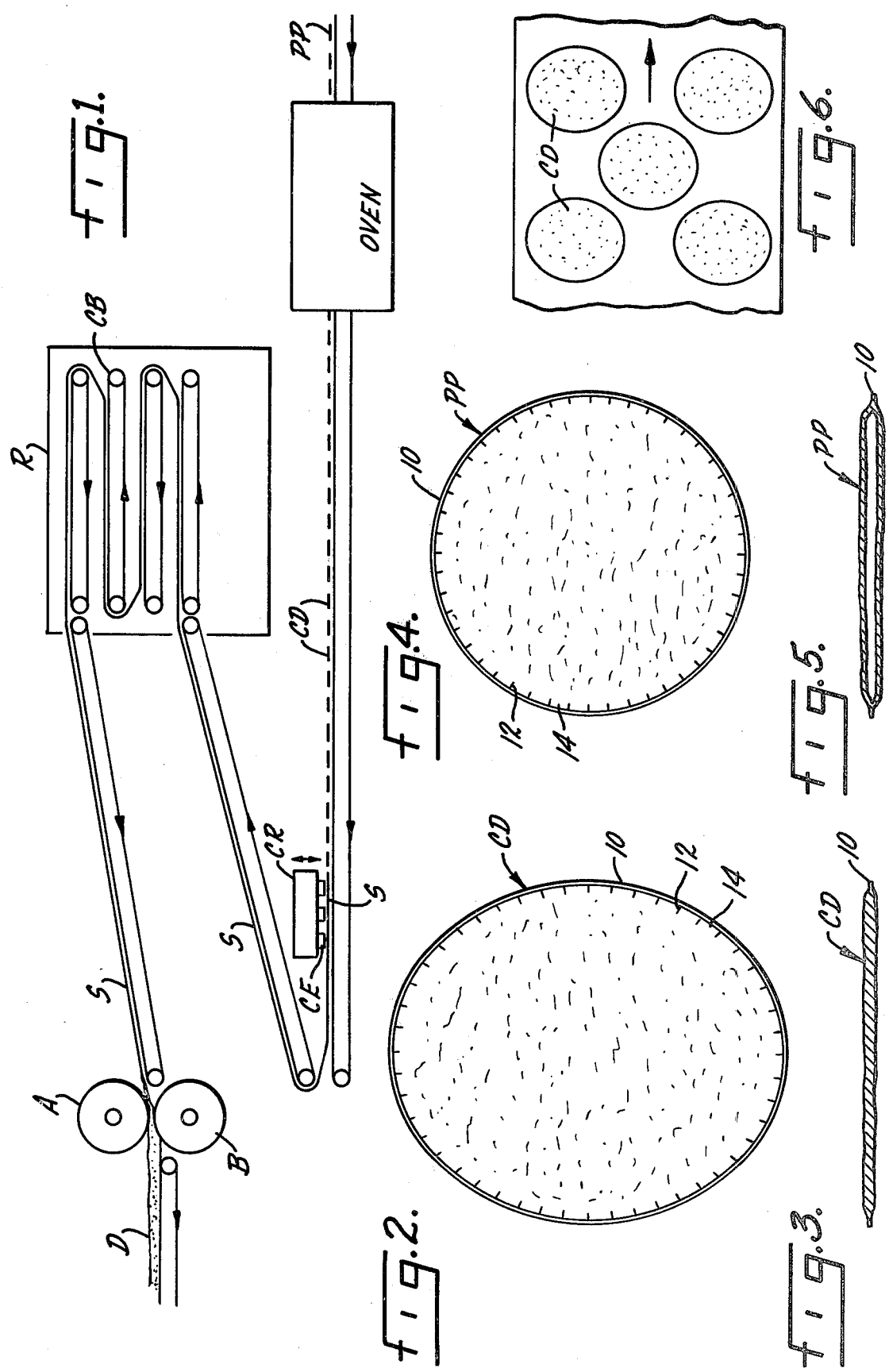

METHOD OF PREPARING POCKET PITA BREAD

This invention relates to baking pocket pita bread.

Pita bread is perhaps the oldest known bread still made, originating in the Near East thousands of years ago. It is a flat bread and when baked properly (short time at high temperature) it will separate internally to afford an internal pocket; hence the term "pocket pita". The pocket of the baked product can be opened at the edge and filled by the consumer.

Popularity or availablity of pocket pita has been retarded by an inability consistently to achieve on a mass production scale the appearance and quality of the hand-made bread. This is due to splitting of the edge during the baking process, doubtless due to the thermal intensity of the short bake. The object of the present invention is to overcome this problem and produce on a mass scale pocket pita bread which does not exhibit an unacceptable statistical average of poor quality, any more than the average bakery product produced on an assembly line.

In the drawing:

FIG. 1 is a diagram of a method of producing pocket pita bread;

FIG. 2 is a plan view of a dough cut-out before being baked and FIG. 3 is a section therethrough;

FIG. 4 is a plan view of the baked bread and FIG. 5 is a section therethrough;

FIG. 6 is a plan view of a pattern of cutting;

Pita bread, as noted, is a flat bread product. It contains no fats or oils and is made from a wheat flour of high gluten content. The dough after the usual preparation is relatively stiff and contains about forty-five (44/46) percent water.

The raw dough D, FIG. 1, is rolled flat by rollers A-B into a continuous sheet S which is relaxed by being passed back and forth inside a relaxer R. The relaxer R presents a stack of conveyor belts CB having opposite runs or flights one atop another. As the sheet S arrives at the end of one belt proceeding in one direction inside the relaxer R it drops down to the next flight which is moving in the opposite direction. The relaxing process is accomplished at ambient conditions (room temperature and humidity) inside the bakery. The amount of time for relaxing depends on room temperature and humidity in the judgement of the baker.

The relaxed sheet S is then cut by a series of cutter elements CE supported by and beneath a reciprocal cutter head CR in a manner to be explained. The individual pieces of cut dough CD delivered from the cutter are preferably oval (FIG. 2) and continuous in section (FIG. 3) and next are baked in an oven. The baking time is for less than a minute, namely, for about twenty-six to thirty-two seconds at a temperature of about 750°-900° F. (about 399°-482° C.). The baking process results in the pocket pita product PP, which is nearly round, FIG. 4, and split in the center, FIG. 5, although the peripheral edge is intact and joined. The exact time and temperature for baking are a judgment of the baker.

The present invention is directed in particular to the way in which the dough is cut, taking into account that the over-all process shown in FIG. 1 is a continuous process for mass production of the baked product on a large scale.

As shown in FIG. 5 the peripheral edge (10) of the product PP is intact and not split, although the center has been split as an inherency in the baking operation. This condition characterizes the desired quality, that is, a pocket pita acceptable in appearance and one in which the interior was properly baked.

Figure 7:
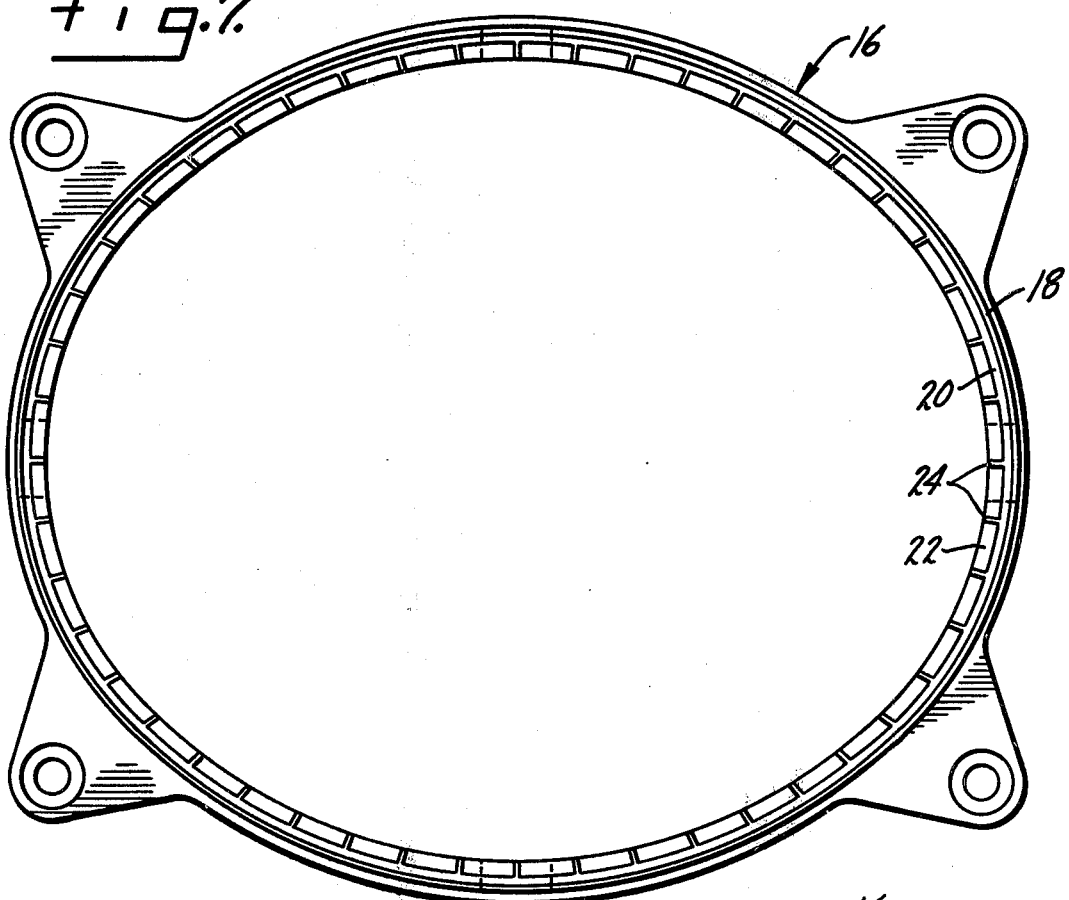
FIG. 7 is a bottom (plan) view of the cutting sleeve.
Figure 8:
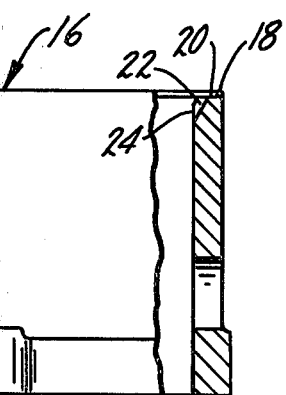
FIG. 8 is a side elevation of the cutting sleeve, partly fragmented.

To avoid a split or open edge, the cutter elements CE for separating the dough cut-outs CD are constructed in an unusual fashion, first to impart to the cut dough a highly compacted peripheral flange or bead 10, a series of compacted, spaced crimps 12 extending about but inward of the flange 10 and a mild pressing of the dough at the areas 14 between the crimps 12, all achieved during one cutting or separation stroke of the cutter head CR. To accomplish this for the nearly round product, each cutter member CE is in the form of an oval sleeve 16, FIG. 7. There are several such sleeves supported by the cutter head CR and they may be arranged in the pattern shown in FIG. 6, that is, there may be one cutter sleeve at each corner of the cutter head and one in the middle so that five oval-shaped cut dough pieces CD are produced on each downward stroke of the cutter head. An attendant strips away the excess dough surrounding the cut-out dough sections. The excess dough is re-processed.

The lower edge of each cutting sleeve presents a thin, flat, continous cutting edge or annulus 18. This annular edge 18 is responsible for separating the cut-out CD from the dough sheet S. Immediately inward of edge 18 and concentric thereto is a narrow, flat continuous recessed or back-cut pressing rim 20 which is responsible for the flash or bead 10 (about 1/32" or 0.8 mm) demarking the compacted, narrow periphery of each piece of cut dough.

Spaced radially inwardly of the annular pressing rim 20 is an inwardly sloped shoulder 22, sloped away from edge 18, and extending entirely about the periphery of the rim 20, being concentric therewith; and projecting from the shoulder 22 are circumferentially equi-distantly spaced crimp fins 24.

Figure 9:
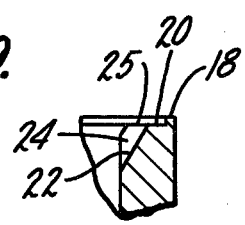
FIG. 9 is a detail section view of a fragment of the cutting sleeve, on an enlarged scale.

The crimp fins 24 are narrow and flat and each is attached as an integral part of the annular shoulder. Each fin 24 has a narrow, flat outer or free end 25, FIG. 9, which is the surface which makes the crimp mark in the dough.

The cutting edge 18 separates the dough piece from the dough strip and surface 20 produces a narrow, densely compacted bead or flange, as already noted, a few millimeters in width. Concurrently the fins 24 indent or crimp the piece of dough inwardly of the outer edge of the dough bead while the shoulders press down on the dough with mild pressure between the crimps.

This four-fold action during cutting (separating along a continous oval edge, making the flange, crimping the dough and pressing the dough down between the crimps) assures against edge splitting or opening when the product is baked, assuring the kind of bake which results in the desired internal split or separation to afford the characteristic pocket.

To give an idea of the dimensions, the baked product shown in the drawing is nearly circular, about six inches in diameter, although the corresponding cutting sleeve may have a long inside diameter of six and three-quarter inches (about seventeen centimeters) and a short diameter of five and three-quarter inches (about fourteen and a half centimeters). The dough, at the time of being cut, may be one-eighth to one-quarter inch thick, that is, about three to six mm. thick. The crimps may be separated by about ten mm. and each cut two and a half to three mm. in length. The crimps do not extend to the edge flange or bead of dough but commence immediately inwardly thereof.

It should also be stressed that we are aware of previous efforts to produce circular pita bread, though not necessarily of the pocket form, by first rolling an individual ball of dough in one direction to obtain an oval shape and then in the cross direction to obtain a nearly circular form which is then baked. It will be noted we cut an oval form from the strip of dough which becomes round when baked and this result is obtained whether or not the bread is of pocket form. To assure the round form we feed the oval cut-outs into the oven with the long axis transverse to the path of movement into the oven as shown by the arrow in FIG. 6.

The product need not necessarily be nearly round; it may be square or even triangular but in either event the cutting edge will be continuous, the pressing rim will be continuous, the dough will be preferably crimped, and the dough will be preferably pressed mildly between the crimps.

We claim:

1. A method of preparing pita pocket bread from corresponding dough cut-outs and comprising, feeding a sheet of dough to a cutting sleeve, cutting the dough about a continuous periphery to separate a cut-out section while concurrently compressing a continuous, flat, narrow, flange about the periphery of the cut out section and, while cutting the dough, crimping the dough at spaced intervals inwardly and radially from the compressed flange, and concurrently applying mild pressure to the surface of the dough at intervals between the crimps; and thereafterwards baking in an oven the cut-out at a temperature and time to produce a pocket pita bread.

2. A method according to claim 1 in which the dough, before cutting, is sheeted and relaxed.

3. A method according to claim 1 or 2 in which the cut-out is baked for about 26 to 32 seconds at a temperature of about 750°-900° F.

4. A method according to claim 1 or 2 in which the cut-out is oval and is fed to the oven with its long axis leading.

* * * * *